United States Patent
Park et al.

(10) Patent No.: US 10,465,045 B2
(45) Date of Patent: Nov. 5, 2019

(54) POLYORGANOSILOXANE AND COPOLYCARBONATE PREPARED BY USING THE SAME

(71) Applicant: LG CHEM, LTD., Seoul (KR)

(72) Inventors: Jung Jun Park, Daejeon (KR); Young Young Hwang, Daejeon (KR); Ki Jae Lee, Daejeon (KR); Moo Ho Hong, Daejeon (KR); Hyong Min Bahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/546,217

(22) PCT Filed: Dec. 27, 2016

(86) PCT No.: PCT/KR2016/015339
§ 371 (c)(1),
(2) Date: Jul. 25, 2017

(87) PCT Pub. No.: WO2017/119657
PCT Pub. Date: Jul. 13, 2017

(65) Prior Publication Data
US 2018/0002488 A1 Jan. 4, 2018

(30) Foreign Application Priority Data

Jan. 7, 2016 (KR) .......... 10-2016-0002245
Dec. 26, 2016 (KR) .......... 10-2016-0179495

(51) Int. Cl.
*C08G 64/18* (2006.01)
*C08G 77/448* (2006.01)
*C08G 77/52* (2006.01)

(52) U.S. Cl.
CPC .......... *C08G 64/186* (2013.01); *C08G 77/448* (2013.01); *C08G 77/52* (2013.01)

(58) Field of Classification Search
CPC .......... C08G 77/04; C08G 77/06; C08G 77/42
USPC .......... 528/10–43, 310
See application file for complete search history.

(56) References Cited

U.S. PATENT DOCUMENTS

| | | | |
|---|---|---|---|
| 5,932,677 A | 8/1999 | Hoover et al. | |
| 6,040,411 A | 3/2000 | Haberle et al. | |
| 8,802,804 B2 * | 8/2014 | Kim | C08G 64/186 528/25 |
| 2007/0241312 A1 | 10/2007 | Hikosaka | |
| 2009/0105444 A1 | 4/2009 | Chatterjee et al. | |
| 2010/0120993 A1 | 5/2010 | Chatterjee et al. | |
| 2010/0160563 A1 | 6/2010 | Miyake et al. | |
| 2011/0160406 A1 | 6/2011 | de Brouwer et al. | |
| 2011/0160408 A1 | 6/2011 | de Brouwer et al. | |
| 2011/0160422 A1 | 6/2011 | Kamps et al. | |
| 2012/0184651 A1 | 7/2012 | Hurst et al. | |
| 2012/0309922 A1 | 12/2012 | Kim et al. | |
| 2014/0234629 A1 | 8/2014 | Sun et al. | |
| 2015/0087804 A1 | 3/2015 | Motoyoshi et al. | |
| 2015/0315336 A1 | 11/2015 | Morizur et al. | |

FOREIGN PATENT DOCUMENTS

| | | |
|---|---|---|
| JP | 3195848 B2 | 8/2001 |
| JP | 5279834 B2 | 9/2013 |
| JP | 2014504669 A | 2/2014 |
| KR | 10-2002-0016922 A | 3/2002 |
| KR | 10-2007-0012499 A | 1/2007 |
| KR | 10-2010-0014667 A | 2/2010 |
| KR | 10-2012-0097403 A | 9/2012 |
| KR | 10-2014-0145160 A | 12/2014 |
| WO | 2011/0122767 A2 | 10/2011 |
| WO | 2013/066002 A1 | 5/2013 |

* cited by examiner

*Primary Examiner* — Marc S Zimmer
(74) *Attorney, Agent, or Firm* — Dentons US LLP

(57) ABSTRACT

The present invention relates to a novel polyorganosiloxane capable of producing a copolycarbonate having improved hardness and to a copolycarbonate prepared by using the same. The novel polyorganosiloxane according to the present invention can be used as a monomer of a copolycarbonate, and it can exhibit improved hardness and chemical resistance simultaneously while maintaining the intrinsic properties of copolycarbonate due to the alkylene or isosorbide-derived structure included in the formula thereof.

10 Claims, 1 Drawing Sheet

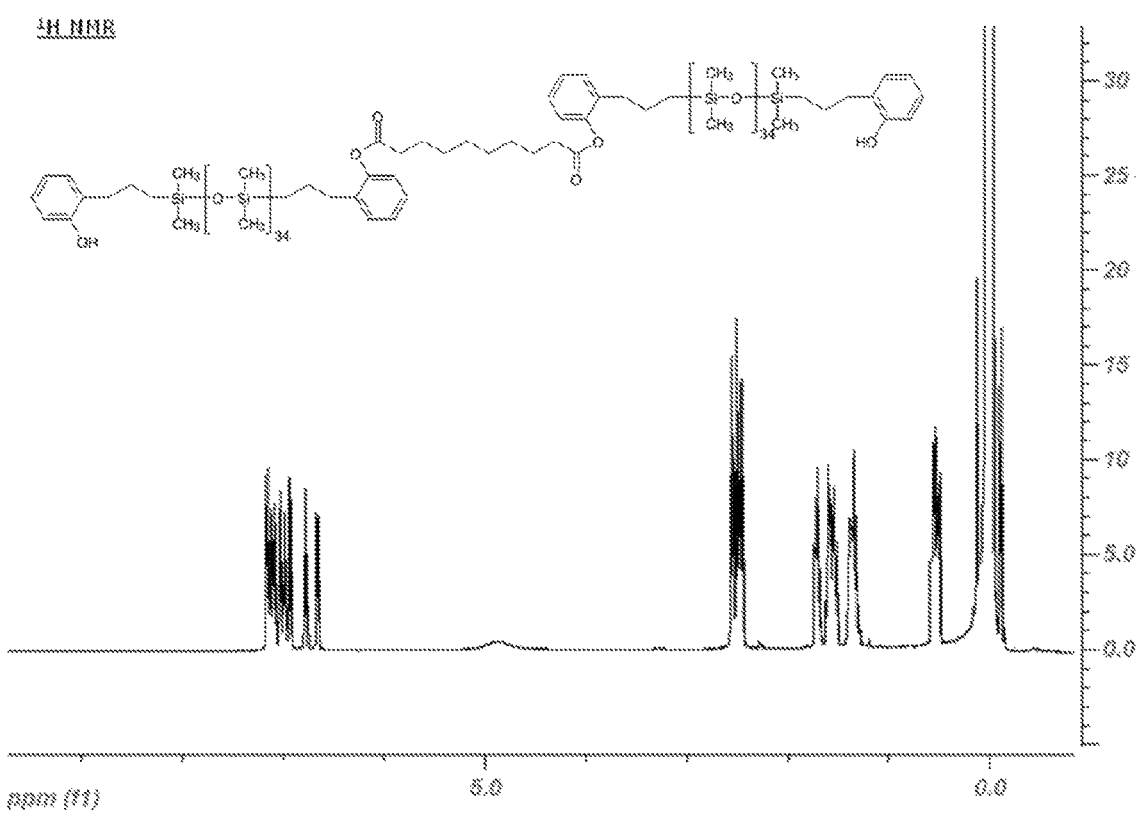

POLYORGANOSILOXANE AND COPOLYCARBONATE PREPARED BY USING THE SAME

CROSS-REFERENCE TO RELATED APPLICATION(S)

This application is a National Stage entry of International Application No. PCT/KR2016/015339, filed on Dec. 27, 2016, and claims the benefit of and priority to Korean Application No. 10-2016-0002245, filed on Jan. 7, 2016, and Korean Application No. 10-2016-0179495, file don Dec. 26, 2016 all of which are hereby incorporated by reference in their entirety of all purposes as if fully set forth herein.

TECHNICAL FIELD

The present invention relates to a novel polyorganosiloxane capable of producing a copolycarbonate having improved hardness and chemical resistance and to a copolycarbonate produced using the same.

BACKGROUND OF ART

Polyorganosiloxane, which is a kind of silicone, means a polymer having a siloxane linkage substituted with organic groups as a backbone. As an example, it is produced by polycondensation of an aromatic diol such as bisphenol A and a carbonate precursor such as phosgene, is colorless and odorless, is slow to oxidize, is a hypoallergenic insulator that is stable even at room temperature, and is used as electrics, electronics, automobiles, machinery, medicines, cosmetics, lubricants, adhesives, gaskets, plastic artificial aids and the like. As a conventional technique, Korean Patent Publication No. 10-2002-0016922 (published on Mar. 6, 2002) discloses trimethylsilyl-terminated polyorganosiloxanes useful as materials for hydrogel contact lenses.

In addition, it has excellent impact strength, dimensional stability, thermal resistance and transparency, and is applied to a wide range of fields such as exterior materials of electrical and electronic products, automotive parts, construction materials, optical components, and the like.

Recently, in order to apply these polycarbonate resins to more various fields, many attempts have been made to obtain desired physical properties by copolymerizing two or more aromatic diols having different structures from each other and introducing monomers having different structures in a main chain of the polycarbonate.

Especially, studies for introducing a polysiloxane structure in a main chain of the polycarbonate have been undergone, but most of these technologies have disadvantages in that production costs are high, and if chemical resistance or impact strength, particularly impact strength at low-temperature is increased, transparency and like are conversely lowered, and if the transparency is improved, the chemical resistance, impact resistance and the like are lowered.

Specifically, U.S. Pat. No. 5,932,677 discloses about using eugenol-polydimethylsiloxane to improve impact strength at low temperatures, and Japanese Patent Registration No. 3,195,848 suggests allylphenol-polydimethylsiloxane.

However, as the application field of the copolycarbonate is expanded, the required hardness of the copolycarbonate is gradually increased. Accordingly, there is a need to develop a copolycarbonate having a novel structure capable of improving the hardness while maintaining the intrinsic physical properties of the copolycarbonate.

In this regard, the present inventors have conducted intensive studies to develop a copolycarbonate having improved hardness and chemical resistance, and found that by introducing an alkylene or isosorbide in a polyorganosiloxane structure used as a monomer of a copolycarbonate as described below, it is possible to improve the hardness and chemical resistance simultaneously while maintaining the intrinsic physical properties of the copolycarbonate, thereby completing the present invention.

DETAILED DESCRIPTION OF THE INVENTION

Technical Problem

It is an object of the present invention to provide a novel polyorganosiloxane capable of producing a copolycarbonate having improved hardness and chemical resistance and a method for the preparation thereof.

It is another object of the present invention to provide a copolycarbonate produced using the above-described polyorganosiloxane and a method for the preparation thereof.

It is a further object of the present invention to provide a molded article produced using the above-described copolycarbonate and a method for the preparation thereof.

Technical Solution

In order to achieve the above object, the present invention provides a polyorganosiloxane represented by the following Chemical Formula 1.

[Chemical Formula 1]

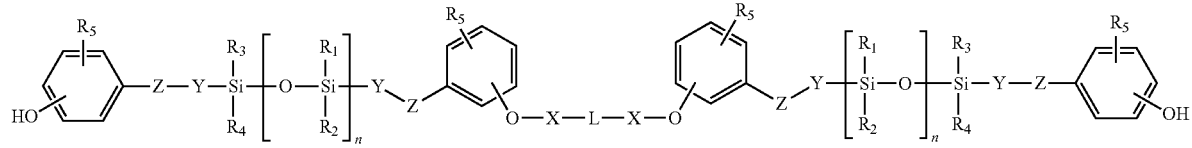

in the Chemical Formula 1, $R_1$ to $R_4$ are each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, each of $R_5$ is independently hydrogen, $C_{1-6}$ alkyl, halogen, hydroxy, $C_{1-6}$ alkoxy, or $C_{6-20}$ aryl, each of X is independently —CO—, or —CO—($C_{6-10}$ arylene)-CO—, each of Y is independently $C_{1-10}$ alkylene, each of Z is independently a bond, or —COO—, L is $C_{1-10}$ alkylene, or

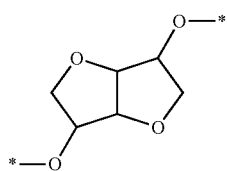 [SMILES: *OC1COC2C(O*)COC12]

and
each of n is independently an integer of 1 to 99.

The polyorganosiloxane represented by the Chemical Formula 1 is used as a monomer of a copolycarbonate as described later, and it is characterized by being able to improve hardness and chemical resistance simultaneously while maintaining a ductility of copolycarbonate due to the alkylene or isosorbide-derived structure (L) included in the above formula.

Preferably, $R_1$ to $R_4$ are each independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. Also preferably, $R_1$ to $R_4$ are each independently $C_{1-10}$ alkyl, more preferably $C_{1-6}$ alkyl, still more preferably $C_{1-3}$ alkyl, and most preferably methyl.

Also preferably, $R_5$ is $C_{1-4}$ alkoxy, more preferably hydrogen, or methoxy.

Also preferably, X is —CO—, or —CO-(phenylene)-CO—.

Also preferably, Y is $C_{1-5}$ alkylene, more preferably propylene, butylene, isobutylene, pentylene, isopentylene, or neopentylene.

Further, when Z is —COO—, it is preferred that the carbonyl of Z is bonded to the benzene ring.

Further, L is preferably a linear $C_{5-9}$ alkylene, or

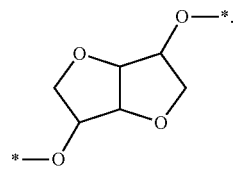

More preferably, L is a linear $C_8$ alkylene.

Further preferably, the polyorganosiloxane represented by the Chemical Formula 1 is a compound represented by Chemical Formula 1-1 or 1-2.

[Chemical Formula 1-1]

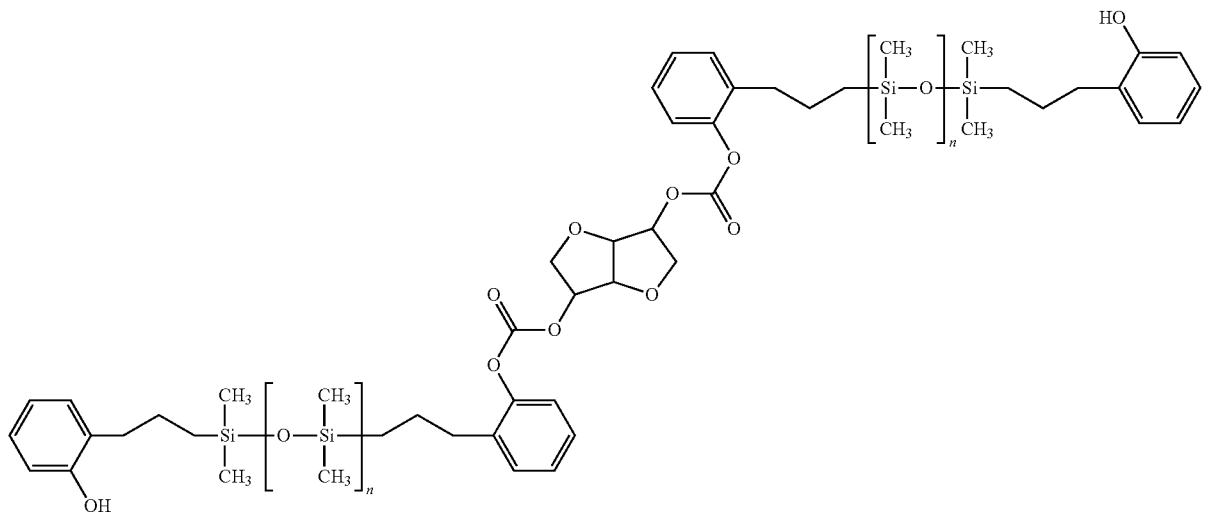

in the Chemical Formula 1-1, n is as defined above.

[Chemical Formula 1-2]

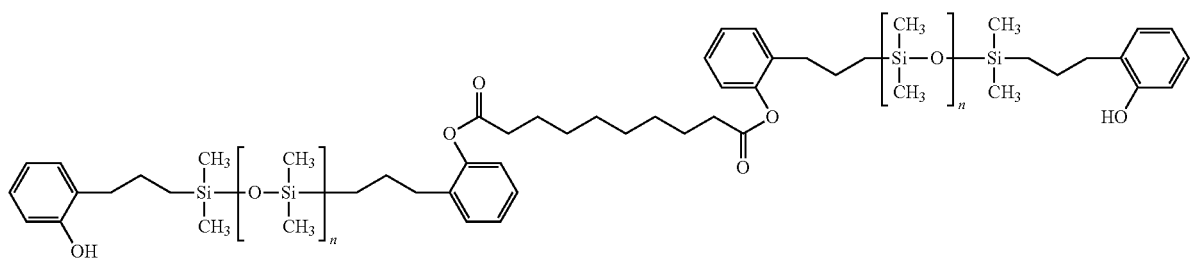

in Chemical Formula 1-2, n is as defined above.

Further, the polyorganosiloxane has preferably a weight average molecular weight of 700 to 8000, more preferably 1500 to 3500. Also preferably, n is 1 to 99, more preferably 20 to 50.

In addition, the present invention provides a method for producing a polyorganosiloxane represented by the Chemical Formula 1 as shown in the following Reaction Scheme 1.

[Reaction Scheme 1]

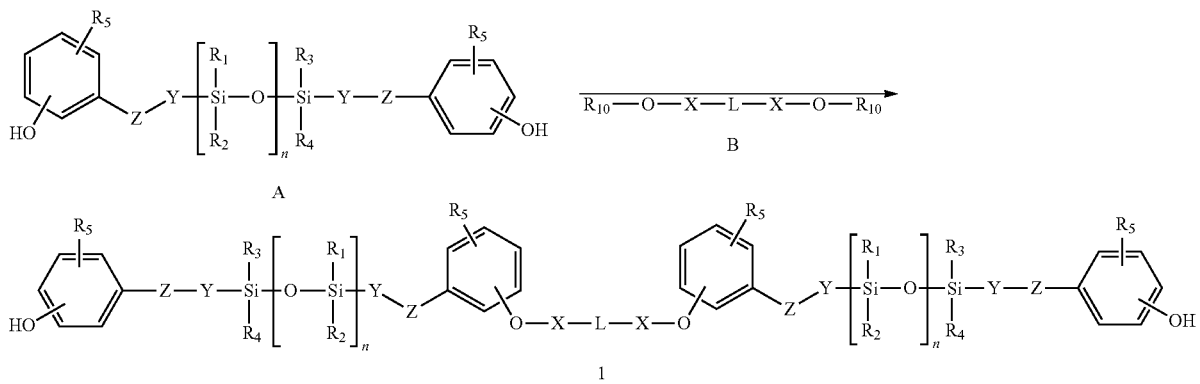

in the Reaction Scheme 1, $R_1$ to $R_5$, X, Y, Z, L and n are as defined in the Chemical Formula 1, $R_{10}$ is hydroxy or halogen, preferably hydroxy or chloro.

The above reaction is a step of producing a compound represented by the Chemical Formula 1 by reacting a compound represented by Chemical Formula A with a compound represented by Chemical Formula B. The molar ratio of the compound represented by the Chemical Formula A to the compound represented by the Chemical Formula B is preferably 2:1 to 3:1.

In addition, the present invention provides a copolycarbonate having a weight average molecular weight of 1,000 to 100,000 g/mol, comprising a repeating unit represented by the following Chemical Formula 2 and a repeating unit represented by the following Chemical Formula 3.

$X_1$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Preferably, $R_6$ to $R_9$ are each independently hydrogen, methyl, chloro, or bromo.

Also preferably, $X_1$ is a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl, or diphenylmethylene. Also preferably, $X_1$ is cyclohexane-1,1-diyl, O, S, SO, $SO_2$, or CO.

The copolycarbonate is prepared by polymerizing the polyorganosiloxane represented by the Chemical Formula 1, the aromatic diol compound and the carbonate precursor. As described above, the polyorganosiloxane is characterized by being able to improve hardness and chemical resistance simultaneously while maintaining a ductility of copolycarbonate due to the alkylene or isosorbide-derived structure in the polyorganosiloxane represented by the Chemical Formula 1.

The aromatic diol compound is a compound represented by Chemical Formula 4 below, which corresponds to the Chemical Formula 3.

[Chemical Formula 2]

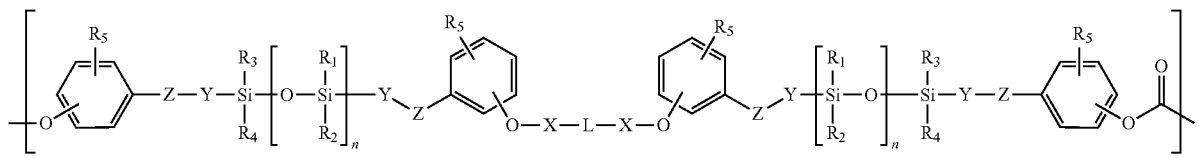

in the Chemical Formula 2, $R_1$ to $R_5$, X, Y, Z, L and n are as defined in the Chemical Formula 1,

[Chemical Formula 3]

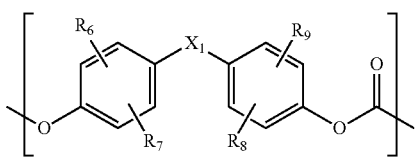

in the Chemical Formula 3, $R_6$ to $R_9$ are each independently hydrogen, $C_{1-10}$ alkyl, $C_{1-10}$ alkoxy, or halogen, and

[Chemical Formula 4]

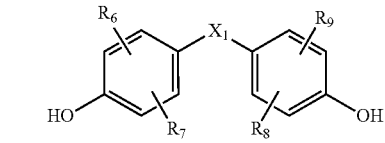

in the Chemical Formula 4, $X_1$ and $R_6$ to $R_9$ are as defined in the Chemical Formula 3.

Specific examples of the aromatic diol compound may include bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulphide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, or 1,1-bis(4-hydroxyphenyl)-1-phenylethane. Preferably, the aromatic diol compound is 2,2-bis(4-hydroxyphenyl)propane (bisphenol A).

The carbonate precursor serves to link the compound represented by the Chemical Formula 1 and the compound represented by the Chemical Formula 4, and specific examples thereof may include phosgene, triphosgene, diphosgene, bromophosgene, dimethyl carbonate, diethyl carbonate, dibutyl carbonate, dicyclohexyl carbonate, diphenyl carbonate, ditolyl carbonate, bis(chlorophenyl)carbonate, m-cresyl carbonate, dinaphthyl carbonate, bis(diphenyl)carbonate, or bishaloformate. Preferably, the carbonate precursor is phosgene.

In addition, the present invention provides a method for preparing the copolycarbonate which comprises polymerizing a polyorganosiloxane represented by the Chemical Formula 1, an aromatic diol compound, and a carbonate precursor.

Preferably, the aromatic diol compound and the carbonate precursor may be used in an amount of 0.1 to 20 parts by weight, more preferably 0.1 to 10 parts by weight, respectively, based on 100 parts by weight of the polyorganosiloxane represented by the Chemical Formula 1.

The polymerization is preferably carried out by an interfacial polymerization, and a polymerization reaction is possible at normal pressure and low temperature during the interfacial polymerization, and adjustment of molecular weight is easy.

It is preferable that the polymerization temperature is 0 to 40° C. and the reaction time is 10 minutes to 5 hours. Further, it is preferable to maintain pH to at least 9, or at least 11 during reaction.

The solvent that can be used for the polymerization is not particularly limited as long as it is a solvent used for the polymerization of polycarbonate in this technical field, and for example, halogenated hydrocarbons such as methylene chloride and chlorobenzene can be used.

Further, the polymerization is preferably carried out in the presence of an acid binder, and examples of the acid binder may include an alkali metal hydroxide such as sodium hydroxide or potassium hydroxide, or an amine compound such as pyridine.

In addition, in order to adjust the molecular weight of the copolycarbonate during the polymerization, the polymerization is preferably carried out in the presence of a molecular weight regulator. As the molecular weight regulator, $C_{1-20}$ alkylphenol can be used, and specific examples thereof include p-tert-butylphenol, p-cumylphenol, decylphenol, dodecylphenol, tetradecylphenol, hexadecylphenol, octadecylphenol, eicosylphenol, docosylphenol and triacontylphenol. The molecular weight regulator may be added before the initiation of polymerization, during the initiation of polymerization, or after the initiation of polymerization. The above molecular weight regulator is contained, for example, in an amount of 0.01 part by weight or more, 0.1 part by weight or more, or 1 part by weight or more; and 10 parts by weight or less, 6 parts by weight or less, or 5 parts by weight or less, based on 100 parts by weight of the aromatic diol compound. Within this range, the required molecular weight can be obtained.

Further, in order to accelerate the polymerization reaction, a reaction accelerator, for example, a tertiary amine compound such as triethylamine, tetra-n-butyl ammonium bromide and tetra-n-butylphosphonium bromide, or a quaternary ammonium compound, or a quaternary phosphonium compound may be further used.

In addition, the present invention provides a molded article produced using the above-mentioned copolycarbonate. As described above, the molded article of the present invention exhibits increased hardness and chemical resistance simultaneously while maintaining a ductility of copolycarbonate due to the alkylene or isosorbide-derived structure in the polyorganosiloxane represented by the Chemical Formula 1, and thereby the application field thereof is broader as compared with a molded article produced using a copolycarbonate previously used in the art.

In addition to the copolycarbonate according to the present invention, the above-mentioned molded article may further include one or more selected from the group consisting of an antioxidant, a plasticizer, an antistatic agent, a nucleating agent, a flame retardant, a lubricant, an impact reinforcing agent, a fluorescent whitening agent, a ultraviolet absorber, a pigment and a dye.

The method for preparing the article may include, for example, the steps of mixing the copolycarbonate according to the present invention and other additives using a mixer, extrusion-molding the mixture with an extruder to produce a pellet, drying the pellet and then injecting the dried pellet with an injection molding machine.

Advantageous Effects

The novel polyorganosiloxane according to the present invention can be used as a monomer of a copolycarbonate, and it can exhibit improved hardness and chemical resistance simultaneously while maintaining the intrinsic properties of copolycarbonate due to the alkylene or isosorbide-derived structure included in the formula thereof.

BRIEF DESCRIPTION OF THE DRAWINGS

FIG. 1 shows a NMR data of the polyorganosiloxane according to one example of the present invention.

DETAILED DESCRIPTION OF THE EMBODIMENTS

Hereinafter, preferred examples are presented to assist in understanding of the present invention. However, these examples are for illustrative purposes only and are not intended to limit the scope of the invention.

PREPARATION EXAMPLE 1

Preparation of AP-PDMS

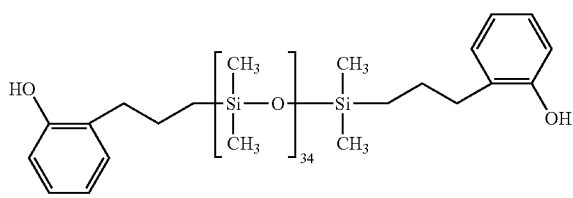

47.60 g (160 mmol) of octamethylcyclotetrasiloxane and 2.40 g (17.8 mmol) of tetramethyldisiloxane were mixed. The mixture was then placed in 3 L flask together with 1 part by weight of an acid clay (DC-A3) relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus obtained was 34 when confirmed through $^1$H NMR.

To the resulting terminal-unmodified polyorganosiloxane, 4.81 g (35.9 mmol) of 2-allylphenol and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus obtained was designated as AP-PDMS (n=34). AP-PDMS is a pale yellow oil, and the repeating unit (n) was 34 when confirmed through $^1$H NMR using Varian 500 MHz, and further purification was not required.

PREPARATION EXAMPLE 2

Preparation of Compound Represented by Chemical Formula 1-1

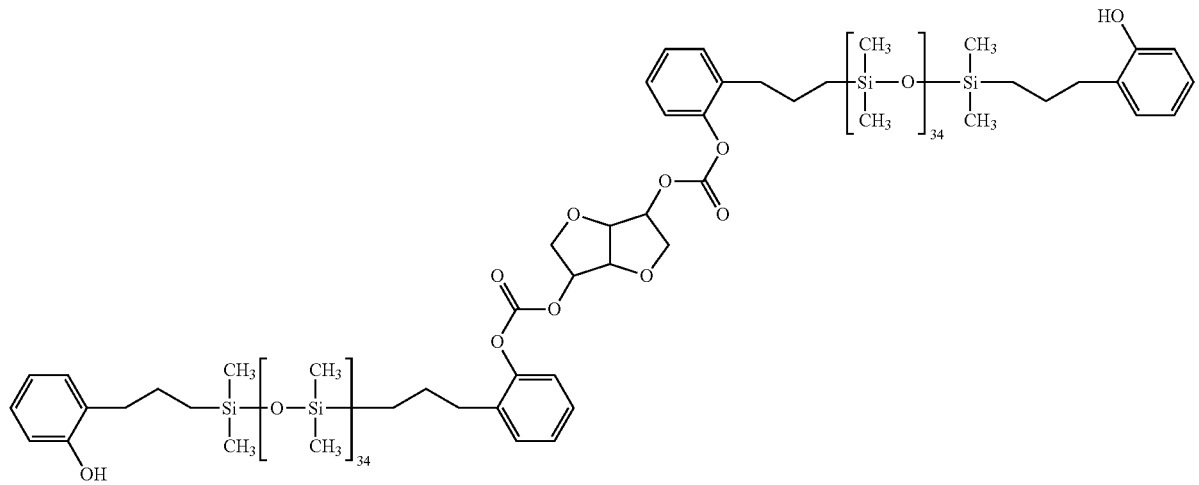

50 g of isosorbide (hereinafter referred to as ISB) was added to a refluxable 1000 mL round flask reactor to which 400 mL of methylene chloride was added, and the mixture was stirred under a nitrogen atmosphere. Then, 80 g of triethylamine was added thereto. Subsequently, 65 g of triphosgene was added, and the mixture was reacted at room temperature for 10 minutes to 3 hours. Triethylamine salt was removed by using a filter to which 100 g of AP-PDMS prepared in Preparation Example 1 was added and reacted. The reaction product was worked up with sodium bicarbonate, washed with distilled water, and the pH was adjusted to neutral and allowed to stand overnight under reduced pressure to prepare a compound represented by the Chemical Formula 1-1.

PREPARATION EXAMPLE 3

Preparation of Compound Represented by Chemical Formula 1-2

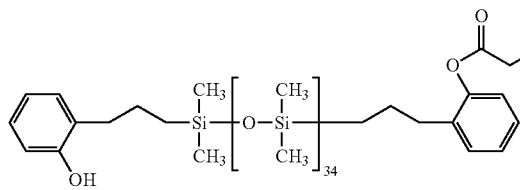

200 mL of chloroform was added to a 500 mL round flask reactor to which 10 g of AP-PDMS prepared in Preparation Example 1 was added. Then, 0.4 g of sebacoyl chloride was added dropwise and reacted under reflux for 2 hours. After completion of the reaction, the reaction mixture was washed and neutralized to prepare a compound represented by the Chemical Formula 1-2. The NMR data of the compound prepared above is shown in FIG. 1.

EXAMPLE 1

1784 g of water, 385 g of NaOH and 232 g of BPA (bisphenol A) were added to the polymerization reactor, and mixed and dissolved under a $N_2$ atmosphere. To this mixture, 4.3 g of PTBP (para-tert butylphenol) and 6.57 g of the compound represented by the Chemical Formula 1-2 prepared in Preparation Example 3 were added by dissolving in MC (methylene chloride). Next, 128 g of TPG (triphosgene) was dissolved in MC and the mixture was added and reacted for 1 hour while maintaining the pH at 11 or higher. After 10 minutes, 46 g of triethylamine (TEA) was added to perform a coupling reaction. After a total reaction time of 1 hour and 20 minutes, the pH was lowered to 4, TEA was removed, and the reaction mixture was washed three times with distilled water and the pH of the resulting polymer was adjusted to neutral, 6-7. The polymer thus obtained was re-precipitated with a mixed solution of methanol and hexane and was then dried at 120° C. to obtain a final copolycarbonate.

EXAMPLE 2

The copolycarbonate was prepared in the same manner as in Example 1, except that 13.14 g of the compound represented by the Chemical Formula 1-2 prepared in Preparation Example 3 was used.

EXAMPLE 3

The copolycarbonate was prepared in the same manner as in Example 1, except that 3.94 g of the compound represented by the Chemical Formula 1-2 prepared in Preparation Example 3 was used.

EXAMPLE 4

The copolycarbonate was prepared in the same manner as in Example 1, except that 1.31 g of the compound represented by the Chemical Formula 1-2 prepared in Preparation Example 3 was used.

EXAMPLE 5

The copolycarbonate was prepared in the same manner as in Example 1, except that 6.57 g of the compound represented by the Chemical Formula 1-1 prepared in Preparation Example 2 was used.

COMPARATIVE EXAMPLE 1784 g of water, 385 g of NaOH and 232 g of BPA (bisphenol A) were added to the polymerization reactor, and mixed and dissolved under a $N_2$ atmosphere. To this mixture,

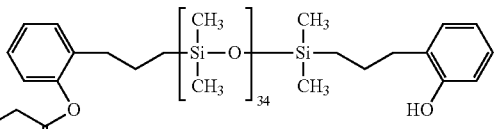

4.3 g of PTBP (para-tert butylphenol) was added by dissolving in MC (methylene chloride). Next, 128 g of TPG (triphosgene) was dissolved in MC and the mixture was added and reacted for 1 hour while maintaining the pH at 11 or higher. After 10 minutes, 46 g of TEA (triethylamine) was added to perform a coupling reaction. After a total reaction time of 1 hour and 20 minutes, the pH was lowered to 4 to remove TEA, and the reaction product was washed three times with distilled water and the pH of the resulting polymer was adjusted to neutral, 6-7. The polymer thus obtained was re-precipitated with a mixed solution of methanol and hexane and was then dried at 120° C. to obtain a final copolycarbonate.

EXPERIMENTAL EXAMPLE

The weight average molecular weight of the copolycarbonates prepared in the Examples and Comparative Example were measured by GPC using PC Standard with Agilent 1200 series.

In addition, with respect to 1 part by weight of the respective copolycarbonates prepared in the Examples and Comparative Example, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritol tetrastearate were added thereto, and the resulting mixture was pelletized using a 030 mm twin-screw extruder provided with a vent, and was injection-molded at a cylinder temperature of 300° C. and a mold temperature of 90° C. using an injection molding machine N-20C (JSW, Ltd.) to prepare a desired specimen. The physical properties of the above specimens were determined in the following manner.

1) Pencil hardness: The pellets were extruded using a heating press to produce 10×10 specimens and the specimen was drawn with a pencil hardness tester (500 g) and confirmed with the naked eye.

2) Glass transition temperature (Tg): The temperature was raised from 20° C. to 200° C. at a temperature raising rate of 10° C./min using a differential scanning calorimeter, quenched up to 20° C., and then heated again to 200° C., thereby measuring the glass transition temperature.

3) Chemical resistance: Izod impact specimens were fixed to a small jig (strain 48.5R). A cloth (length×width=1 cm×0.5 cm) was placed on the specimen, and 0.5 mL of Nivea sunspay as the solvent for testing chemical resistance was dropped on the cloth. Thereafter, the time until the Izod specimens were cracked and broken was measured to evaluate the chemical resistance.

The results are shown in Table 1 below.

TABLE 1

| | Ex. 1 | Ex. 2 | Ex. 3 | Ex. 4 | Ex. 5 | Comparative Example |
|---|---|---|---|---|---|---|
| Weight average molecular weight(g/mol) | 31,500 | 31,500 | 31,500 | 31,500 | 31,500 | 31,500 |
| Pencil hardness | 148.6 | HB | 2B | 2B | B | 2B |
| Glass transition temperature(Tg, °C.) | 148.6 | 147.8 | 151.2 | 151.8 | 150.2 | 152.1 |
| Chemical resistance(sec) | 1500 | 2500 | 1200 | 980 | 1400 | 600 |

The invention claimed is:

1. A polyorganosiloxane of Chemical Formula 1:

[Chemical Formula 1]

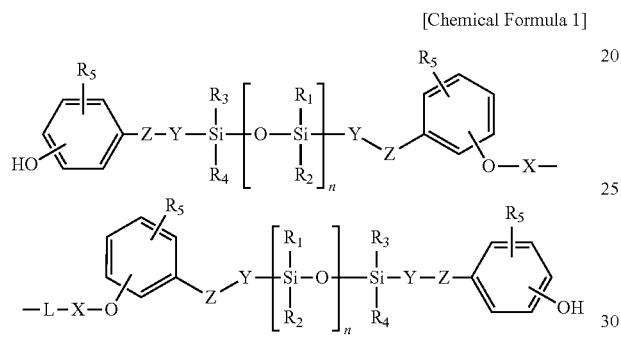

wherein in the Chemical Formula 1:
$R_1$ to $R_4$ are each independently hydrogen, halogen, $C_{1-10}$ alkoxy, allyl, $C_{1-10}$ haloalkyl, $C_{6-20}$ aryl, or $C_{1-15}$ alkyl unsubstituted or substituted with oxiranyl, oxiranvl-substituted $C_{1-10}$ alkoxy, or $C_{6-20}$ aryl;
each $R_5$ is independently hydrogen, $C_{1-6}$ alkyl, halogen, hydroxy, $C_{1-6}$ alkoxy, or $C_{6-20}$ aryl;
each X is independently —CO—, or —CO—(phenylene)—CO—;
each Y is independently $C_{1-10}$ alkylene;
each Z is independently a bond, or —COO—;
L is

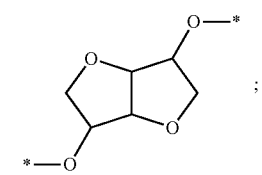 [SMILES: *OC1COC2C(O*)COC12]

; and
each n is independently an integer of 1 to 99.

2. The polyorganosiloxane according to claim 1, wherein $R_1$ to $R_4$ are each independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl.

3. The polyorganosiloxane according to claim 1, wherein $R_5$ is hydrogen or $C_{1-4}$ arkoxy.

4. The polyorganosiloxane according to claim 1, wherein Y is $C_{1-5}$ alkylene.

5. The polyorganosiloxane according to claim 1, wherein the polyorganosiloxane of Chemical Formula 1 is a compound of Chemical Formula 1-1:

[Chemical Formula 1-1]

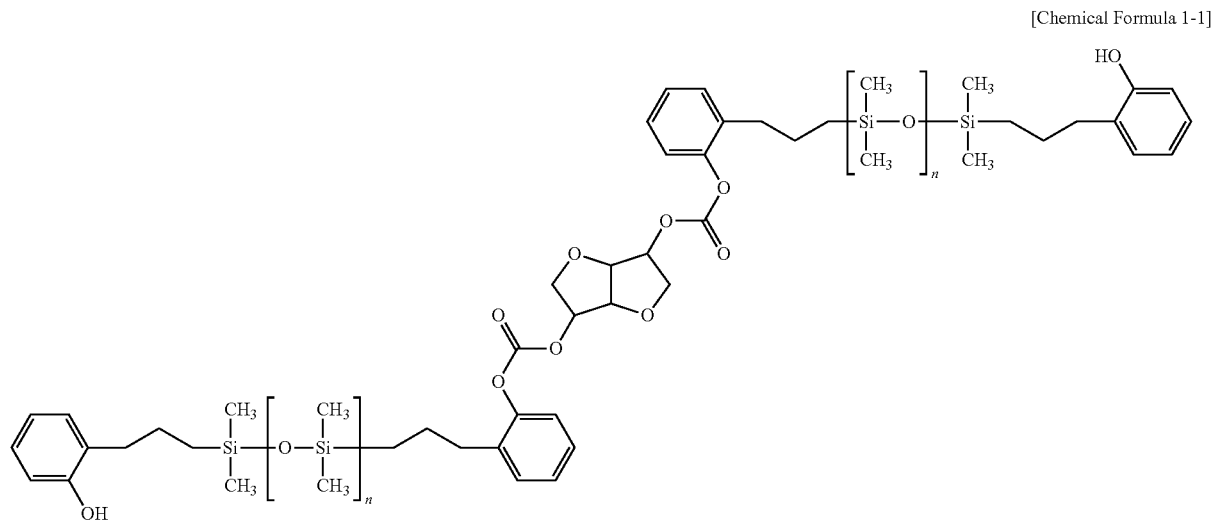

wherein each n is independently an integer of 1 to 99.

6. The polyorganosiloxane according to claim 1, wherein the polyorganosiloxane has a weight average molecular weight of 700 to 8000.

7. A copolycarbonate having a weight average molecular weight of 1,000 to 100,000 g/mol, comprising a repeating unit of the following Chemical Formula 2, and a repeating unit of the following Chemical Formula 3:

[Chemical Formula 2]

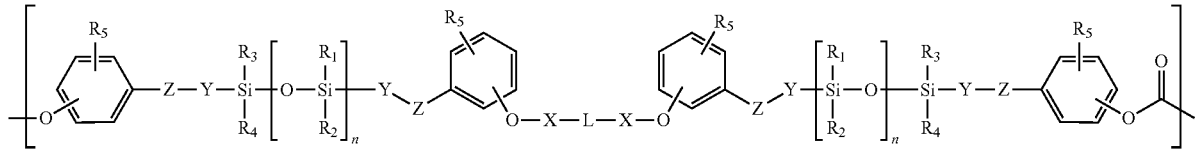

wherein in the Chemical Formula 2:
$R_1$ to $R_4$ are each independently hydrogen; halogen; $C_{1-10}$ allkoxy; allyl; $C_{1-10}$ haloalkyl; $C_{6-20}$ aryl, or $C_{1-15}$ alkyl unsubstituted or substituted with oxiranyl, oxiranyl-substituted $C_{1-10}$ alkoxy, or $C_{6-20}$ aryl;
each $R_5$ is independently hydrogen, $C_{1-6}$ alkyl, halogen, hydroxy, $C_{1-6}$ alkoxy, or $C_{6-20}$ aryl;
each X is independently —CO— or —CO—(phenylene)—CO—;
each Y is independently $C_{1-10}$ alkylenel;
each Z is independently a bond, or —COO—;
L is

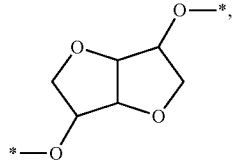

and
each n is independently an integer of 1 to 99;

[Chemical Formula 3]

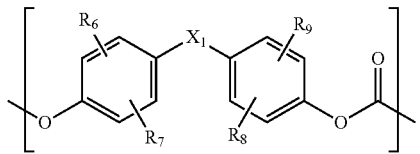

wherein in the Chemical Formula 3;
$R_6$ to $R_9$ are each independently hydrogen, $C_{1-10}$ alkyl, $C_{1-10}$ alkoxy, or halogen; and
$X_1$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

8. The copolycarbonate according to claim 7, wherein $X_1$ is a linear or branched $C_{1-10}$ alkylene unsubstituted or substituted with phenyl, cyclohexane-1,1-diyl, O, S, SO, $SO_2$, or CO.

9. The copolycarbonate according to claim 7, wherein $R_6$ to $R_9$ are each independently hydrogen, methyl, chloro, or bromo.

10. A molded article comprising the copolycarbonate of claim 7.

* * * * *

UNITED STATES PATENT AND TRADEMARK OFFICE
CERTIFICATE OF CORRECTION

PATENT NO. : 10,465,045 B2
APPLICATION NO. : 15/546217
DATED : November 5, 2019
INVENTOR(S) : Jung Jun Park et al.

It is certified that error appears in the above-identified patent and that said Letters Patent is hereby corrected as shown below:

In the Claims

At Column 14, Line 29 to Line 34 should read:
2. The polyorganosiloxane according to claim 1,
    wherein $R_1$ to $R_4$ are each independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl.

At Column 14, Line 35 to Line 36 should read:
3. The polyorganosiloxane according to claim 1, wherein $R_5$ is hydrogen or $C_{1-4}$ alkoxy.

Signed and Sealed this
Twenty-fourth Day of December, 2019

Andrei Iancu
*Director of the United States Patent and Trademark Office*